United States Patent
Ma et al.

(10) Patent No.: US 8,367,430 B2
(45) Date of Patent: Feb. 5, 2013

(54) SHAPE CHARACTERIZATION WITH ELLIPTIC FOURIER DESCRIPTOR FOR CONTACT OR ANY CLOSED STRUCTURES ON THE CHIP

(75) Inventors: Yuansheng Ma, Santa Clara, CA (US);
Harry J. Levinson, Saratoga, CA (US);
Jongwook Kye, Pleasanton, CA (US)

(73) Assignee: Globalfoundries, Inc., Grand Cayman (KY)

( * ) Notice: Subject to any disclaimer, the term of this patent is extended or adjusted under 35 U.S.C. 154(b) by 782 days.

(21) Appl. No.: 12/575,068

(22) Filed: Oct. 7, 2009

(65) Prior Publication Data
US 2011/0079779 A1 Apr. 7, 2011

(51) Int. Cl.
*H01L 21/66* (2006.01)
(52) U.S. Cl. .................. 438/14; 438/129; 257/206
(58) Field of Classification Search ........... 438/14, 438/16, 129; 257/206; 716/118, 119
See application file for complete search history.

(56) References Cited

U.S. PATENT DOCUMENTS

| | | | |
|---|---|---|---|
| 2004/0195507 A1* | 10/2004 | Yamaguchi et al. | 250/310 |
| 2005/0251771 A1* | 11/2005 | Robles | 716/5 |
| 2008/0058978 A1 | 3/2008 | Cain et al. | |
| 2008/0194046 A1 | 8/2008 | Ma et al. | |
| 2009/0028423 A1* | 1/2009 | Sandstrom et al. | 382/149 |
| 2009/0135390 A1 | 5/2009 | La Fontaine et al. | |
| 2009/0187866 A1* | 7/2009 | Ou et al. | 716/4 |
| 2009/0193369 A1 | 7/2009 | Chan et al. | |
| 2009/0263024 A1* | 10/2009 | Yamaguchi et al. | 382/199 |

OTHER PUBLICATIONS

Habermas et al., "Contact hole edge roughness: circles vs. stars", Metrology, Inspection, and Process Control for Microlithography, 2004, vol. 5375, pp. 1-9, US.

* cited by examiner

*Primary Examiner* — Kevin M Picardat
(74) *Attorney, Agent, or Firm* — Ditthavong Mori & Steiner, P.C.

(57) ABSTRACT

Shapes and orientations of contacts or other closed contours on an integrated circuit are characterized by calculating Elliptic Fourier descriptors. The descriptors are then used for generating design rules for the integrated circuit and for assessing process capability for the manufacturing of the integrated circuit. Monte Carlo simulation can be performed in conjunction with the elliptic Fourier descriptors.

17 Claims, 7 Drawing Sheets

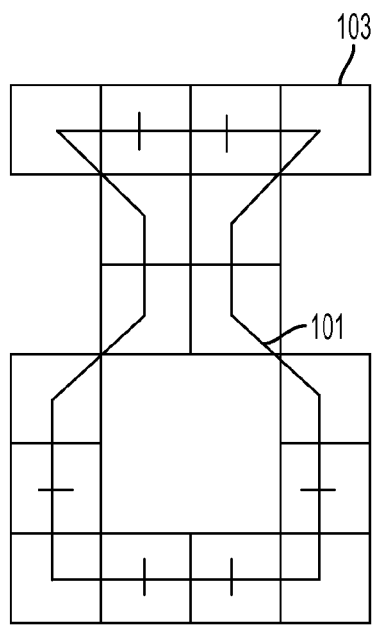
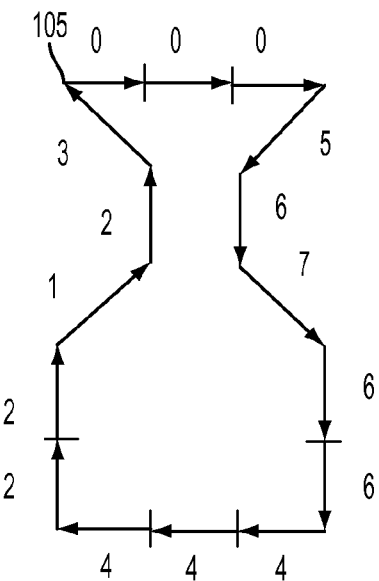
FIG. 1A  FIG. 1B
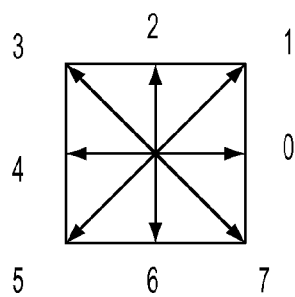
FIG. 1C

SHAPE CHARACTERIZATION WITH ELLIPTIC FOURIER DESCRIPTOR FOR CONTACT OR ANY CLOSED STRUCTURES ON THE CHIP

TECHNICAL FIELD

The present disclosure relates to semiconductor integrated circuit manufacturing, and more specifically to characterization of shapes of closed contours on an integrated circuit.

BACKGROUND

Semiconductor circuit manufacturing is subject to certain design rules for laying out features on wafers. As semiconductor circuits become more highly integrated, it is important to design semiconductor chips in such a manner as to provide more elements on a chip for a higher yield in the final product. The minimum feature size depends on the chemical and optical limits of a particular lithographic system, and the tolerance for distortions of the shape. Variation of a critical dimension can be caused by line edge roughness (LER) occurring during lithographic processing of the semiconductor wafer. For contacts or other closed contours on an integrated circuit, their shapes and orientations, including LER, are of significant concern for generating design rules and assessing process capability for the manufacturing of integrated circuits.

Conventionally, a single ellipse is used to fit closed contours, such as contacts, to determine their shape. Then, LER is characterized by fitting the shape and calculating the standard deviation of the residuals. The frequency components of the roughness can thus be retrieved. For contacts or any other closed contours on the chip, usually the shape information which contains both orientation and low frequency components of the edge is the key factor for the function of the device. However, the traditional methods do not provide shape information, and the detailed roughness information at specific orientations is lost and cannot be retrieved.

A need therefore exists for an improved method for accurately determining both the shape and orientation of closed contours on a semiconductor chip, especially at the 22 nanometer (nm) and 15 nm technology nodes.

SUMMARY

After a semiconductor element is patterned, for example lithographically on an integrated circuit chip, the contour is measured and a curve is obtained. The semiconductor element may be any element on the chip that can be represented by a closed contour, such as a contact, via, or metal-to-metal connection. The frequency components of the edges of the curve and the orientation of the curve may be determined, i.e., by chain coding the curve and performing a discrete Fourier transformation on the chain coded curve, thereby calculating elliptic Fourier descriptors. The descriptors may then be used to reconstruct the contour shape and orientation. In general, smaller numbers of harmonics (usually less than 10) of the descriptors are computationally fast and can provide a relatively accurate reconstruction of the contour.

The descriptors may be used in conjunction with a Monte Carlo simulation to generate design rules for the integrated circuit chip, such as a minimum distance between a contact and a polysilicon gate. Optical proximity correction model calibration may also be performed on the integrated circuit. To determine process impact on patterning, the patterned element may be etched, and the etched contour may be measured to obtain a second curve. Both frequency components and also the orientation of the second curve may be determined, and the second contour shape and orientation may be reconstructed. Then the two reconstructed shapes may be compared.

A semiconductor device includes at least one element that can be represented by a closed contour and one or more additional elements. The at least one element may be patterned, and the contour of the patterned element may be measured to obtain a curve. Elliptic Fourier descriptors may be calculated for the curve and used to reconstruct the contour shape and orientation and then may be used in conjunction with a Monte Carlo simulation to generate design rules for the device. The at least one semiconductor element may be a contact, a via, or a metal-to-metal connection, for example a contact, the additional element may be a polysilicon gate, and the design rule may set the minimum distance between the contact and the gate.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 1A schematically illustrates a linearly interpolated contour, FIG. 1B illustrates the contour as a series of vectors with chain code link labels, and FIG. 1C illustrates chain code link labels;

DETAILED DESCRIPTION

Figure 2A:
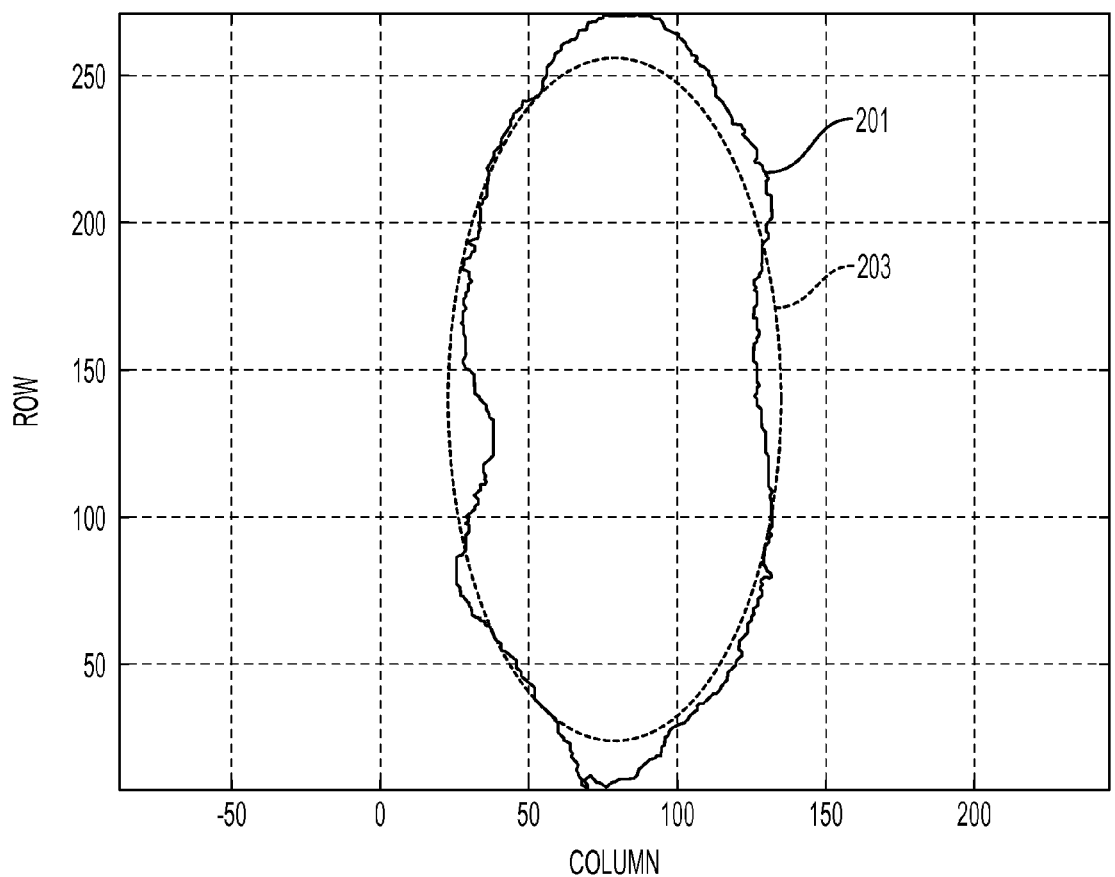
FIGS. 2A-2E graphically illustrate $1^{st}$, $4^{th}$, $6^{th}$, $8^{th}$, and $50^{th}$ harmonic representations of a contact.
Figure 2B:
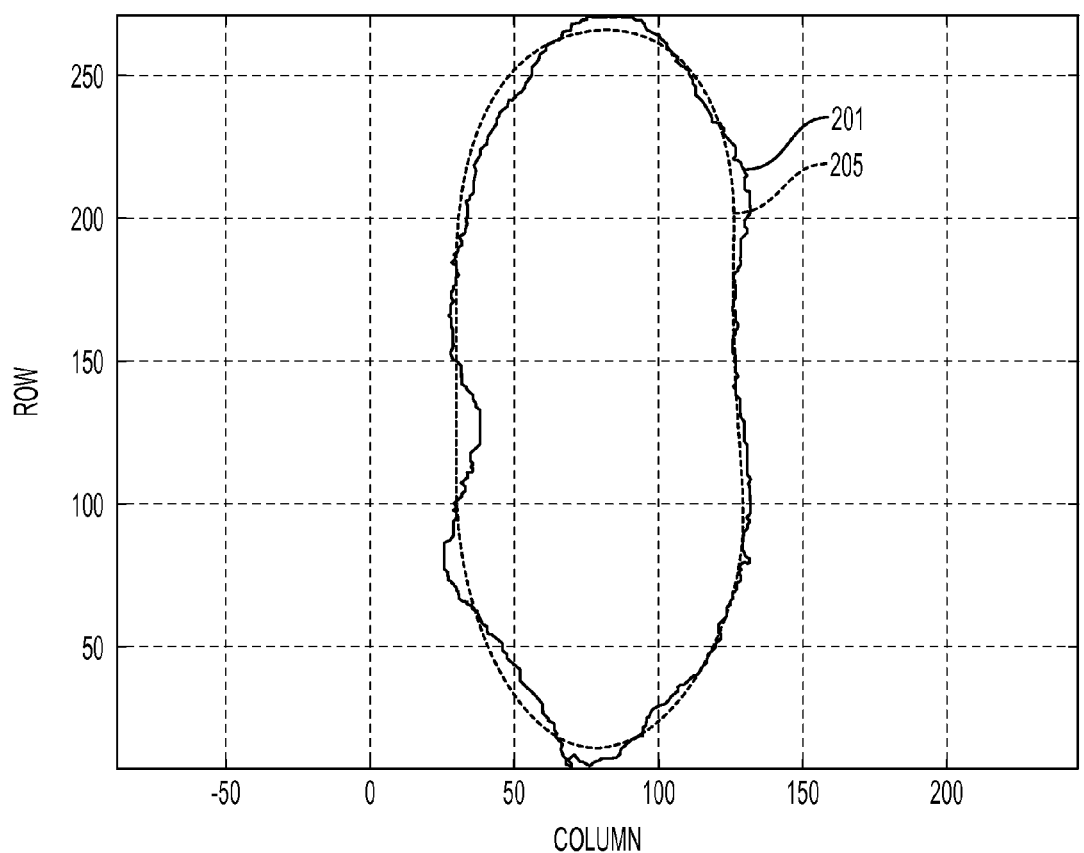
Figure 2C:
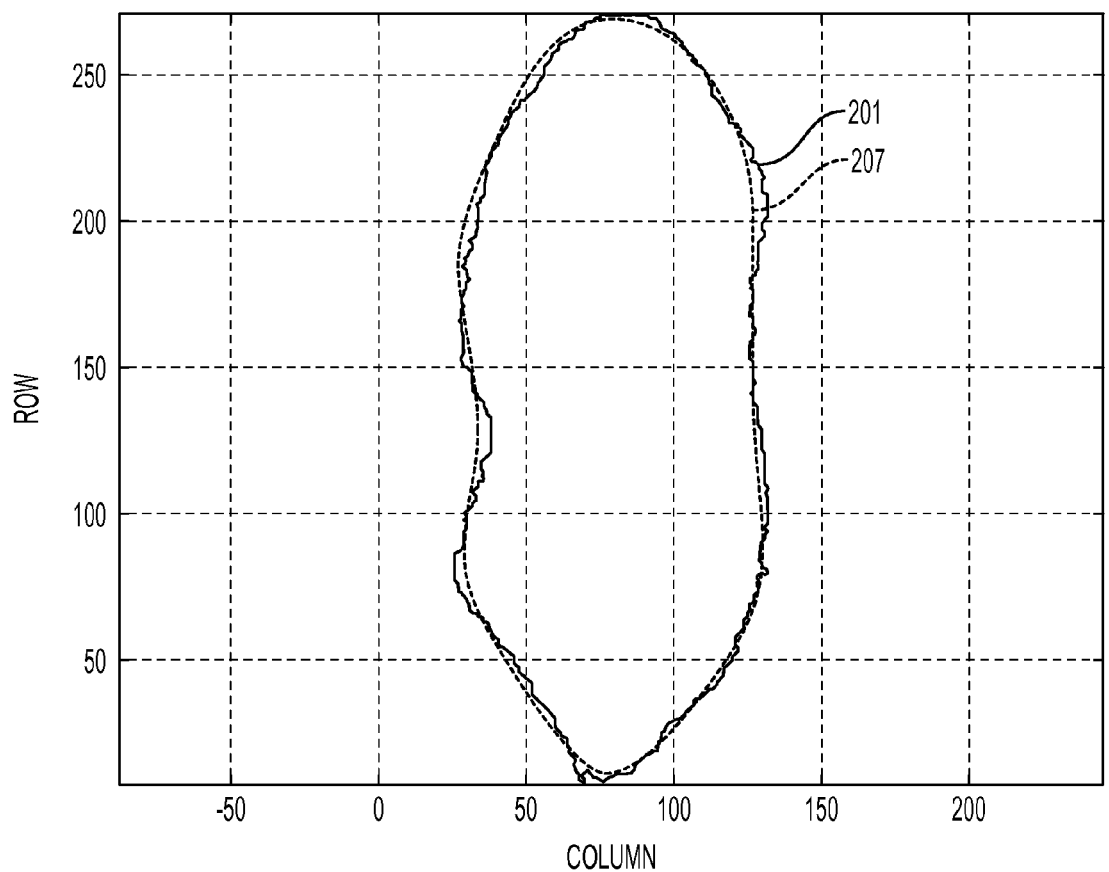
Figure 2D:
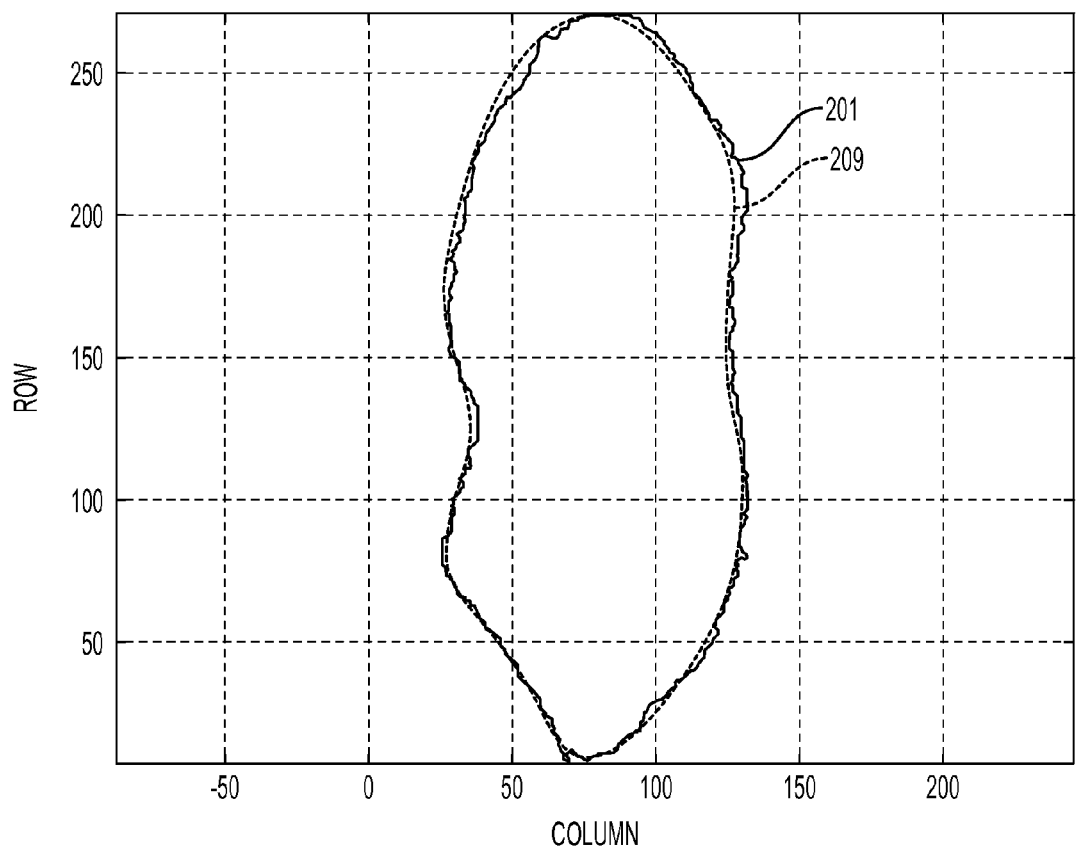
Figure 2E:
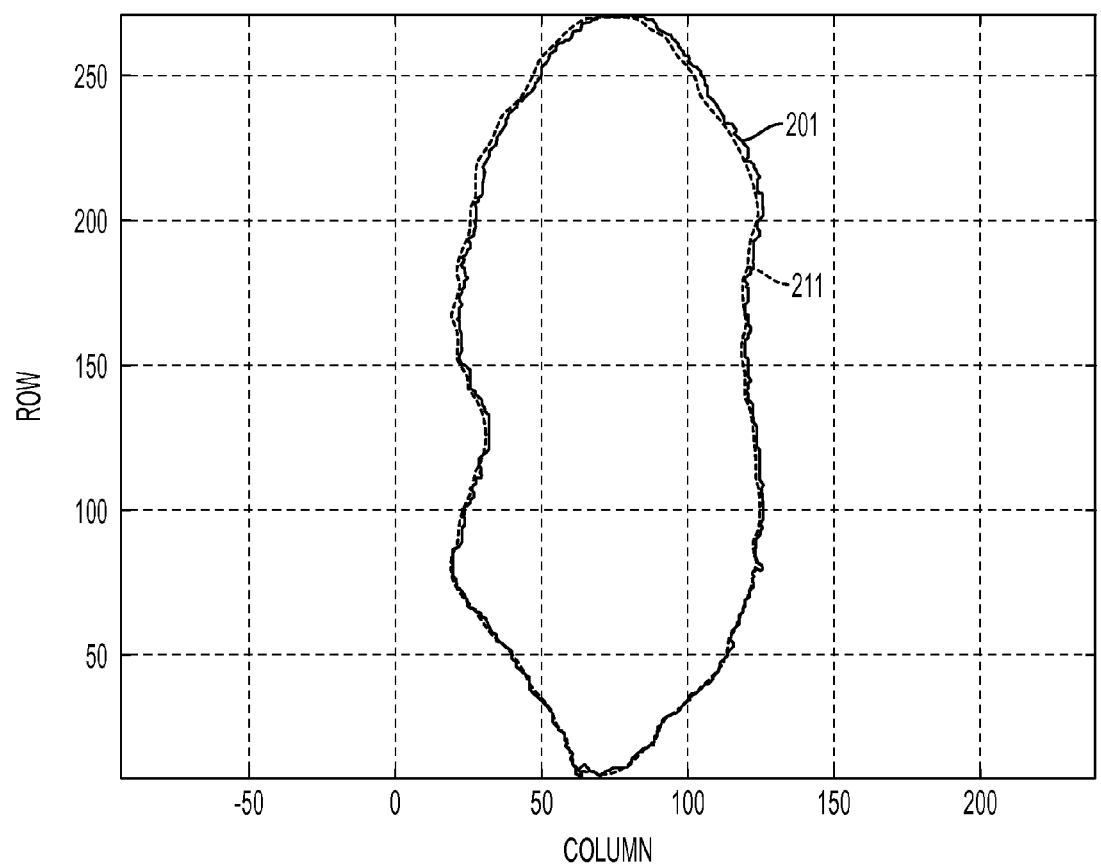

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments.

Smaller design rules necessitate more accurate and repeatable overlay metrology to ensure adequate levels of device reliability and manufacturing throughput. Semiconductor manufacturers often employ metrology techniques to improve the quality of the wafers and the wafer manufacturing processes. For example, semiconductor metrology information is utilized to calibrate device simulators, aid in electrical testing, predict the performance of devices during the manufacturing process, aid in semiconductor research and development, or aid in process control for present or future semiconductor manufacturing techniques. In addition metrology is used to aid in feedback or feed-forward semiconductor manufacturing.

By measuring closed contours on an integrated circuit, for example contacts, vias, and metal to metal connections, histograms of Fourier or Zernike components may be obtained, which in turn may be used in conjunction with Monte Carlo simulation to generate design rules, such as the minimum distance between contacts and gates. The histograms may also be used for yield prediction, electrical performance prediction (since LER affects leakage or power consumption of the system), electromagnetic evaluation, resist evaluation, and optical proximity correction (OPC) model calibration. Measured contours may further be used as a quantitative measure of shape fidelity for the resists used in forming the semiconductor components and also after etching in order to deduce the process impact on patterning. Thus, it is essential to be able to accurately characterize the shape and orientation of measured contours.

Classic Fourier descriptors have difficulty reconstructing shapes that double back on themselves, such that a radius from the center of the contour to one portion of the curve crosses another part of the curve. Zernike decompositions may be used to retrieve a closed contour, but they are computationally expensive. Elliptic Fourier descriptors, however, can characterize the shape and orientation of any closed contour relatively accurately at a reduced cost and high speed.

The coefficients of elliptic Fourier descriptors are calculated by the discrete Fourier transformation of chain-coded contours. Chain coding is explained with reference to FIGS. 1A-1C. Adverting to FIG. 1A, a linearly interpolated contour 101 is shown with each horizontal and vertical segment equal to one, the length of one side of unitary square 103, and each diagonal segment equal to √2, the length of a diagonal of square 103. Assuming that the length of the linear segment between the (i−1)th and the ith points is $\Delta t_i$, a segment $\Delta t_i$ can be determined as follows:

$$\Delta t_i = 1 + \left(\frac{\sqrt{2}-1}{2}\right)(1-(-1)^{r_i}). \quad \text{(eq. 1)}$$

Then, the length of the contour from the starting point to the pth point is $\Delta t_p = \Sigma \Delta t_i$ from i=1 to i=p, and the perimeter of the contour is $T=t_K$, where K is the total number of the points on the contour. The Kth point is equivalent to the starting point.

Beginning at an arbitrary point 105 in FIG. 1B and moving clockwise around the contour, each segment may be given one of eight directions and represented as an arrow. Each direction is labeled with a different chain code link label, r, ranging from 0 to 7. FIG. 1C illustrates the eight directions and the corresponding chain code link labels 0 to 7.

The contour 103 can be represented as a sequence of x- and y-coordinates of ordered points measured contour-clockwise from the arbitrary starting point. The x-coordinate of the pth point is $x_p=\Sigma \Delta x_i$ from i=1 to i=p, where $\Delta x_i$ is the displacement along the x-axis of the contour between the (i−1)th and ith points and equals:

$$\Delta x_i = sgn(6-r_i)sgn(2-r_i). \quad \text{(eq. 2)}$$

Similarly, the y-coordinate of the pth point is $y_p=\Sigma \Delta y_i$ from i=1 to i=p, where $\Delta y_i$ is the displacement along the y-axis of the contour between the (i−1)th and ith points and equals:

$$\Delta y_i = sgn(4-r_i)sgn(r_i). \quad \text{(eq. 3)}$$

Then, elliptic Fourier expansion of the sequences of the x- and y-coordinates yields:

$$x(t) = A_0 + \sum_{n=1}^{\infty} a_n \cos\frac{2n\pi t}{T} + b_n \sin\frac{2n\pi t}{T} \quad \text{(eq. 4)}$$

$$y(t) = C_0 + \sum_{n=1}^{\infty} c_n \cos\frac{2n\pi t}{T} + d_n \sin\frac{2n\pi t}{T} \quad \text{(eq. 5)}$$

$A_0$ and $C_0$ are the x and y coordinates of the center of the contour, n is the harmonic number of the coefficients ($a_n$, $b_n$, $c_n$, and $d_n$), $$a_n = \frac{T}{2n^2\pi^2} + \sum_{p=1}^{K} \frac{\Delta x_p}{\Delta t_p}\left[\cos\frac{2n\pi t_p}{T} - \cos\frac{2n\pi t_{p-1}}{T}\right], \quad \text{(eq. 6)}$$

$$b_n = \frac{T}{2n^2\pi^2} + \sum_{p=1}^{K} \frac{\Delta x_p}{\Delta t_p}\left[\sin\frac{2n\pi t_p}{T} - \sin\frac{2n\pi t_{p-1}}{T}\right], \quad \text{(eq. 7)}$$

$$c_n = \frac{T}{2n^2\pi^2} + \sum_{p=1}^{K} \frac{\Delta y_p}{\Delta t_p}\left[\cos\frac{2n\pi t_p}{T} - \cos\frac{2n\pi t_{p-1}}{T}\right], \text{ and} \quad \text{(eq. 8)}$$

$$d_n = \frac{T}{2n^2\pi^2} + \sum_{p=1}^{K} \frac{\Delta y_p}{\Delta t_p}\left[\sin\frac{2n\pi t_p}{T} - \sin\frac{2n\pi t_{p-1}}{T}\right]. \quad \text{(eq. 9)}$$

Adverting to FIG. 2A, contour 201 graphically represents the detected edges of a contact hole. Ellipse 203 is the first harmonic representation of the contact applying elliptic Fourier descriptors, i.e., when n equals one. As illustrated, the basic shape of the contour can be reconstructed with the first harmonic representation. For better resolution of the contour shape, higher harmonics are required.

FIGS. 2B-2E compare the $4^{th}$, $6^{th}$, $8^{th}$, and $50^{th}$ harmonic representations (elements 205, 207, 209, and 211) of the contact, respectively, with the detected edges of the contact. As illustrated, the $50^{th}$ harmonic representation substantially matches the detected shape. However, obtaining the $50^{th}$ harmonic representation is a computationally time consuming process. Harmonics lower than ten, on the other hand, are relatively fast computations. It has been determined that the $8^{th}$ harmonic representation is sufficient for setting up design rules such as the minimum distance between a contact and the gate, as the low frequency information is the most useful.

Figure 3:
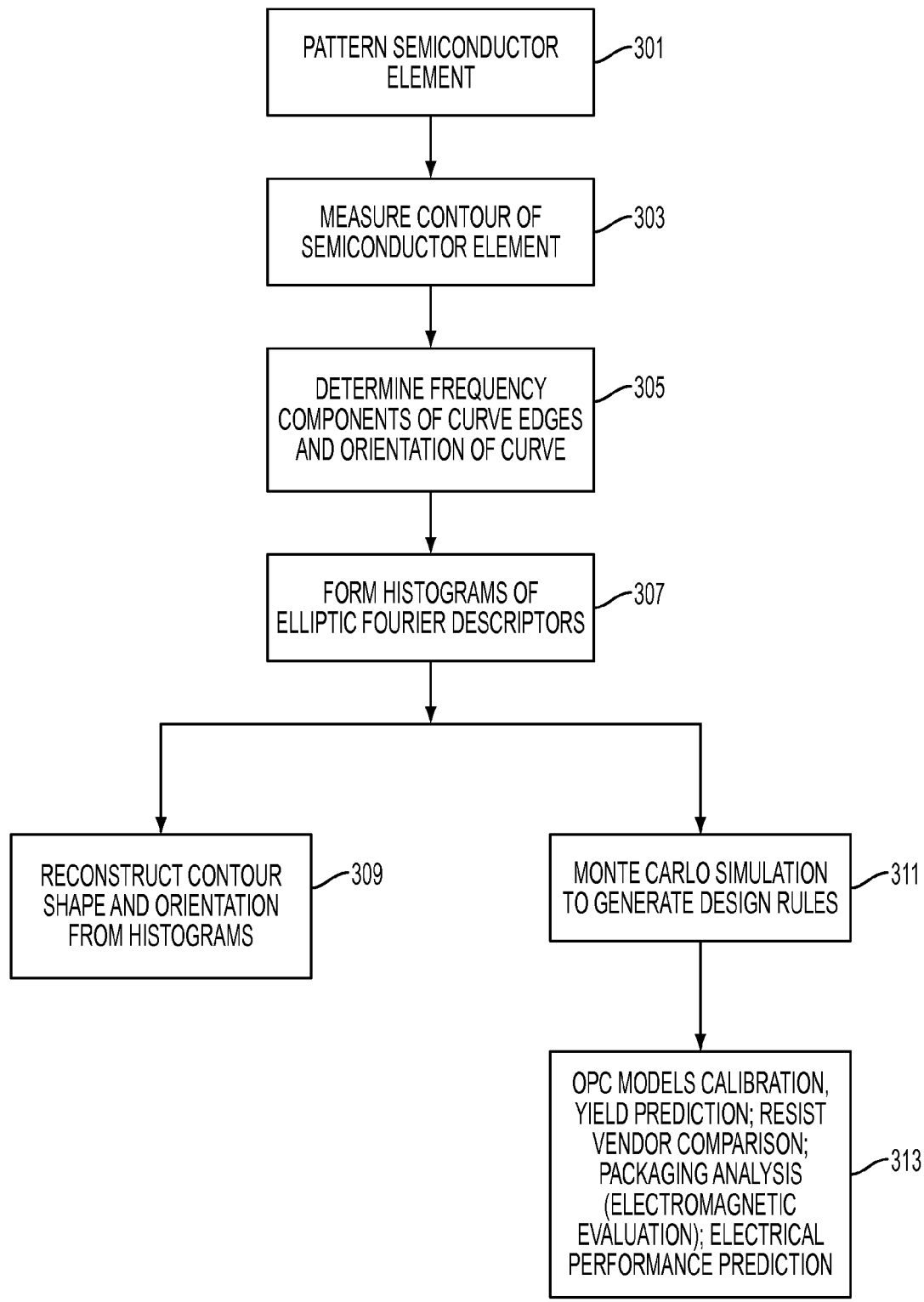
FIG. 3 is a flowchart of a semiconductor process, according to an exemplary embodiment.

FIG. 3 is a flowchart of a semiconductor process, according to an exemplary embodiment. The process begins in step 301 with patterning, for example lithographically patterning on an integrated circuit chip, a semiconductor element which can be represented by a closed contour. The semiconductor element maybe, for instance, a contact, a via, or a metal-to-metal connection.

In step 303, the contour of the patterned element is measured, and a curve is obtained. Next, at step 305 the low frequency components of the edges of the curve and the orientation of the curve are determined by calculating elliptic Fourier descriptors for the curve. The curve is chain coded, as illustrated in FIG. 1B, and a discrete Fourier transformation is performed on the chain coded curve.

Histograms are formed from the elliptic Fourier descriptors (step 307), and the contour shape and orientation are reconstructed (step 309). It has been found that the harmonics below 10 can be obtained quickly, and the eighth harmonic yields a sufficiently accurate reproduction of the curve for further processing such as generating design rules.

The histograms may also be used in conjunction with a Monte Carlo simulation to generate design rules, such as for setting the minimum distance between the contact and a polysilicon gate, as shown in step 311. After the design rules are created, an OPC model may be calibrated in step 313. In addition, yield prediction, resist vendor comparison, packaging analysis (electromagnetic evaluation), and electrical performance prediction also can be obtained in step 313. Steps 303 through 309 may be performed again after etching the semiconductor element and the two reconstructed shapes and orientations compared for a quantitative measure of shape fidelity after etching, thus to deduce the relevant process impact on patterning.

Embodiments of the present disclosure can achieve several technical effects, including critical design rule set-up, electrical performance prediction, electromagnetic evaluation, quantitative measure of shape fidelity after patterning and after etching, and OPC calibration. The present disclosure enjoys industrial applicability in all integrated circuits, particularly at the 22 nm and 15 nm technology nodes.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   patterning a semiconductor element having a closed contour configuration;
   measuring the contour of the patterned semiconductor element to obtain a curve;
   determining low frequency components of edges of the curve and curve orientation; and
   reconstructing shape and orientation of the contour in accordance with the determined low frequency components.

2. The method according to claim 1, wherein the patterning step comprises lithographic patterning.

3. The method according to claim 1, wherein the determining step comprises calculating elliptic Fourier descriptors for the curve.

4. The method according to claim 3, wherein the calculating step comprises: chain coding the curve; and
   performing discrete Fourier transformation on the chain coded curve.

5. The method according to claim 3, wherein the calculating step comprises obtaining the nth harmonic of the elliptic Fourier descriptors, for a value of n in the range between about 8 and about 10.

6. The method according to claim 3, further comprising:
   executing a Monte Carlo simulation in conjunction with the elliptic Fourier descriptors; and
   generating design rules for an integrated circuit chip.

7. The method according to claim 6, wherein the semiconductor element comprises a contact and the step of generating comprises setting a minimum distance between the contact and a polysilicon gate.

8. The method according to claim 7, further comprising performing optical proximity correction model calibration.

9. The method according to claim 3, further comprising:
   etching the semiconductor element;
   measuring a second contour of the etched semiconductor element to obtain a second curve;
   determining low frequency components of edges of the second curve and the second curve orientation;
   reconstructing the second contour shape and orientation; and
   comparing the reconstructed first contour shape and orientation with the reconstructed second contour shape and orientation to determine process impact on patterning.

10. A semiconductor device comprising at least one semiconductor element having a closed contour and one or more additional elements, the device fabricated by a method comprising:
    patterning the at least one semiconductor element;
    measuring the contour of the patterned semiconductor element to obtain a curve;
    calculating elliptic Fourier descriptors for the curve to determine low frequency components of edges of the curve and the curve orientation;
    reconstructing the contour shape and orientation;
    performing a Monte Carlo simulation in conjunction with the elliptic Fourier descriptors; and
    generating design rules for the at least one semiconductor element and the one or more additional elements.

11. The semiconductor device according to claim 10, wherein the calculating step comprises:
    chain coding the curve; and
    performing discrete Fourier transformation on the chain coded curve.

12. The semiconductor device according to claim 10, wherein the at least one semiconductor element comprises a contact, a via, or a metal-to-metal connection.

13. The semiconductor device according to claim 12, wherein the at least one semiconductor element comprises a contact and the one or more additional elements comprises a polysilicon gate.

14. The semiconductor device according to claim 13, wherein the design rules set a minimum distance between the contact and the polysilicon gate.

15. The semiconductor device according to claim 14, wherein the contact and polysilicon gate are formed on an integrated circuit chip.

16. The semiconductor device according to claim 12, wherein the fabrication method further comprises performing optical proximity correction model calibration.

17. A method comprising:
    lithographically patterning at least one semiconductor contact on an integrated circuit chip;
    measuring the contour of the patterned semiconductor contact to obtain a curve;
    chain coding the curve;
    performing discrete Fourier transformation on the chain coded curve to calculate elliptic Fourier descriptors for the curve, thereby determining low frequency components of the edges of the curve and the curve orientation;
    reconstructing the contour shape and orientation;
    performing a Monte Carlo simulation in conjunction with the elliptic Fourier descriptors; and
    generating design rules for the minimum distance between the contact and a polysilicon gate for the integrated circuit chip.

* * * * *